US009639089B2

(12) United States Patent
Abdel-Motagaly et al.

(10) Patent No.: US 9,639,089 B2
(45) Date of Patent: May 2, 2017

(54) GUST COMPENSATION SYSTEM AND METHOD FOR AIRCRAFT

(71) Applicant: THE BOEING COMPANY, Chicago, IL (US)

(72) Inventors: Khaled Abdel-Motagaly, Redmond, WA (US); Rafael E. Caicedo, Snohomish, WA (US); Christopher D. Dallara, Seattle, WA (US); Alexander C. Ho, Seattle, WA (US); Kioumars Najmabadi, Clyde Hill, WA (US); Tze L. Siu, Seattle, WA (US); Paul C. Strefling, Seattle, WA (US); Hisako Yamashiro, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/730,986

(22) Filed: Jun. 4, 2015

(65) Prior Publication Data
US 2016/0357191 A1 Dec. 8, 2016

(51) Int. Cl.
*G05D 1/08* (2006.01)
*B64C 13/18* (2006.01)
(Continued)

(52) U.S. Cl.
CPC ........... *G05D 1/0825* (2013.01); *B64C 13/16* (2013.01); *B64C 13/18* (2013.01); *G05D 1/0066* (2013.01); *B64D 2700/62228* (2013.01)

(58) Field of Classification Search
CPC .... G05D 1/0825; G05D 1/0066; B64C 13/18; B64C 13/16; B64D 2700/62228
See application file for complete search history.

(56) References Cited

U.S. PATENT DOCUMENTS 2,962,943 A 11/1960 Coleman
3,215,374 A 11/1965 Olshausen
(Continued)

FOREIGN PATENT DOCUMENTS

DE 102004029196 1/2006
DE 102006003199 8/2007
(Continued)

OTHER PUBLICATIONS

Partial European Search Report for EP 16172697.1-1802, dated Oct. 24, 2016.
(Continued)

*Primary Examiner* — Khoi Tran
*Assistant Examiner* — Robert Nguyen
(74) *Attorney, Agent, or Firm* — Joseph M. Butscher; The Small Patent Law Group, LLC (57) ABSTRACT

A gust compensation system is configured to adaptively reduce gust loads exerted into an aircraft. The gust compensation system may include a first sensor proximate to a front of the aircraft. The first sensor is configured to output a first signal. A second sensor may be distally located from the front of the aircraft. The second sensor is configured to output a second signal. A gust signal sub-system is configured to receive the first and second signals and generate a gust signal based on analysis of the first and second signals. The gust signal sub-system outputs the gust signal and may modify a load parameter signal in response to the gust signal exceeding a load alleviation threshold.

20 Claims, 4 Drawing Sheets

(51) Int. Cl.
*B64C 13/16* (2006.01)
*G05D 1/00* (2006.01)

(56) References Cited

U.S. PATENT DOCUMENTS

| | | |
|---|---|---|
| 3,814,912 A | 6/1974 | Klein |
| 8,774,987 B2 | 7/2014 | Walton |
| 2004/0079835 A1* | 4/2004 | Volk .......................... B64C 9/22 244/76 C |
| 2008/0043234 A1 | 2/2008 | Mirand |
| 2009/0157239 A1* | 6/2009 | Walton ................... G05D 1/046 701/6 |
| 2013/0166110 A1* | 6/2013 | Golling ................ B64C 21/025 701/3 |

FOREIGN PATENT DOCUMENTS

| | | |
|---|---|---|
| DE | 202007010518 | 10/2007 |
| EP | 0742142 | 11/1996 |
| GB | 723529 | 2/1955 |

OTHER PUBLICATIONS

Extended European Search Report for EP 161726971.1-1802/ 3101504, dated Dec. 12, 2016.

\* cited by examiner

GUST COMPENSATION SYSTEM AND METHOD FOR AIRCRAFT

FIELD OF THE DISCLOSURE

Embodiments of the present disclosure generally relate to gust compensation systems and methods for aircraft, and in particular, to systems and methods that may be used to mechanically reduce effects of gusts in relation to an aircraft.

BACKGROUND OF THE DISCLOSURE

Aircraft often encounter atmospheric turbulence, such as rapid differences in wind speed and/or direction from an average or a mean flow of air. For example, atmospheric turbulence may include, but is not limited to, wind shear, wind gradients, clear-air turbulence, wake turbulence, air pockets, and the like. Atmospheric turbulence may include vertical and horizontal wind shears or gusts of wind. Vertical shear or gusts of wind typically occur at higher levels in the atmosphere and above or near a vertical surface, such as a mountain. Horizontal shear may occur near weather fronts or near a coastal region. Pilots try to avoid flying in turbulent conditions whenever possible.

During flight, a commercial transport aircraft often operates in a normal cruising configuration that minimizes or otherwise reduces fuel consumption. In the normal cruising configuration, various control surfaces of the aircraft may be in a retracted or other such position that minimizes or otherwise reduces drag. However, the cruising configuration may not be well-suited to compensate for structural loads on wings and other aircraft surfaces caused by gusts.

Aerodynamically efficient control surface configurations may not be well-suited to handle a gust. Aircraft are required to meet discrete gust load criteria, as specified by the Federal Aviation Administration (FAA). As such, when an aircraft encounters a gust, one or more control surfaces are deflected. In short, certain wing configurations are preferable for redistributing gust loads. In this manner, instead of adding structural weight to an aircraft to provide adequate design margin for gust loads, less structure may be required when and control surfaces are reconfigured to compensate for the gust loads. However, while flying an aircraft with deflected control surfaces is structurally weight-efficient with respect to gust loads, the gust configuration is not fuel efficient, as the deflected surfaces cause drag.

In general, the total load on the aircraft includes: a "1 g load" which represents the forces and moments normally sustained in straight, level, unaccelerated flight; a maneuver load which is the result of temporary, pilot-commanded deviations from straight, level, unaccelerated flight; and a gust load that is the result of atmospheric disturbances.

Further, an aircraft may include one or more monitoring systems that detect gusts for the purpose of load alleviation. For example, a load factor may be used as an indicator of a gust and used to reconfigure control surfaces of the aircraft. However, such signals do not differentiate between intentional aircraft maneuvers and gusts. Further, using the load factor typically requires the aircraft to penetrate the gust and respond to the gust before the control surfaces are able to be reconfigured. As such, using the load factor as a feedback signal does not provide sufficient time for the control surfaces to be optimally reconfigured before a time of peak load.

Accordingly, a need exists for a system and method for efficiently configuring an aircraft to compensate for gusts. A need exists for a system and method for withstanding wind gusts that do not increase an overall structural weight of an aircraft.

SUMMARY OF THE DISCLOSURE

Certain embodiments of the present disclosure provide a gust compensation system configured to adaptively reduce gust loads exerted into an aircraft. The gust compensation system may include a sensor sub-system mounted to the aircraft. The sensor sub-system is configured to output one or more signals. The gust compensation system may also include a gust signal sub-system configured to receive the signal(s) from the sensor sub-system and generate a gust signal based on analysis of the signal(s). The gust estimate subsystem is configured to output the gust signal to move control surfaces in response to the gust estimate signal. In at least one embodiment, the sensor sub-system may include a first sensor proximate to a front of the aircraft, wherein the first sensor is configured to output a first signal, and a second sensor configured to output a second signal. The gust signal sub-system is configured to receive the first and second signals and generate a gust signal based on analysis of the first and second signals.

Certain embodiments of the present disclosure provide a gust compensation system configured to adaptively reduce gust loads exerted into an aircraft. The gust compensation system may include a first sensor proximate to a front of the aircraft. The first sensor is configured to output a first signal. A second sensor is configured to output a second signal. The second sensor may utilize a sensing mechanism that differs from that of the first sensor. A gust signal sub-system is configured to receive the first and second signals and generate a gust signal based on analysis of the first and second signals. The gust signal sub-system may be configured to output the gust signal to move control surfaces in response to the gust signal. In at least one embodiment, different sensors, such as look-ahead sensor or pressure ports, may provide signals to the gust signal sub-system. In at least one other embodiment, instead of two sensors, a single sensor may be used in conjunction with the gust signal sub-system.

Certain embodiments of the present disclosure provide a gust compensation system that is configured to adaptively reduce gust loads exerted into an aircraft. The gust compensation system may include a first sensor proximate to a front of the aircraft. The first sensor is configured to output a first signal. A second sensor may be distally located from the front of the aircraft (that is, the second sensor is further away from the front of the aircraft than the second sensor). The second sensor is configured to output a second signal. A gust signal sub-system may be configured to receive the first and second signals and generate a gust signal based on analysis of the first and second signals. The gust signal sub-system may output the gust signal to modify a load parameter signal (such as a normal acceleration signal, angle of attack signal, load signal, pressure signal, lift signal, and the like) in response to the gust signal exceeding a load alleviation threshold.

The load parameter signal as modified by the gust signal may cause control surfaces of the aircraft to change from a normal configuration to a gust load reduction configuration. In at least one embodiment, the system may include a load alleviation (LA) sub-system that is operatively coupled to one or more control surfaces of the aircraft. The LA sub-system may be configured to detect or generate the load parameter signal. The LA sub-system is configured to maintain the control surface(s) in a normal configuration (which may still be applicable to a reconfiguration used to move maneuver loads, for example) when the load parameter signal is unmodified by the gust signal. For example, a normal acceleration signal, for example, when unmodified by a gust signal, may still cause control surfaces to move to a load alleviation configuration to reduce maneuver loads. The LA sub-system is configured to move the control surface(s) into a gust load reduction configuration in response to the load parameter signal being modified by the gust signal.

In at least one embodiment, the first sensor may be a vane that is configured to output the first signal as a vane angle of attack signal. The second sensor may be an inertial sensor that is configured to output the second signal as an inertial angle of attack signal. The vane may be proximate to a nose of the aircraft. The inertial sensor may be positioned on or in a wing of the aircraft, or various other locations. In at least one embodiment, one or both of the first and second sensors may include an accelerometer.

The load alleviation threshold may include a load magnitude that exceeds a load exerted on a wing of the aircraft caused by intentional maneuvering of the aircraft. For example, the load magnitude may be greater than a force value exerted on a surface of a wing that is caused by an intentional maneuver of the aircraft (such as caused by a pilot). In at least one other embodiment, control surfaces may be moved proportionally based on the load alleviation threshold being exceeded.

The gust signal sub-system may include at least one control unit operatively coupled to at least one memory. As an example, the gust signal sub-system may be configured to generate the gust signal as follows:

$$\alpha\_gust = \alpha\_air + (\sin^{-1}((VS - L*q*\pi/180)/TAS) + \beta*\sin\Phi - \theta)/\cos\Phi$$

in which $\alpha\_gust$ is the gust signal, $\theta$ is a pitch angle of the aircraft, $\beta$ is a sideslip angle of the aircraft, $\Phi$ is a roll angle of the aircraft, q is a pitch rate of the aircraft, VS is a vertical speed of the aircraft, TAS is a true air speed of the aircraft, and $\alpha\_air$ is a vane angle of attack.

Certain embodiments of the present disclosure provide a gust compensation method configured to adaptively reduce gust loads exerted into an aircraft. The gust compensation method may include detecting at least one parameter (such as an angle of attack) of an aircraft with a first sensor proximate to a front of an aircraft, outputting a first signal based on the parameter(s) from the first sensor, detecting the parameter(s) of the aircraft with a second sensor that is distally located from the front of the aircraft, outputting a second signal based on the parameter(s) from the second sensor, using a gust signal sub-system to generate a gust signal based on analysis of the first and second signals, comparing the gust signal to a load alleviation threshold, and modifying a load parameter signal with the gust signal in response to the gust signal exceeding the load alleviation threshold.

Certain embodiments of the present disclosure provide an aircraft that may include a fuselage including an internal cabin having a cockpit, first and second wings extending from the fuselage, at least one vertical stabilizer, at least one horizontal stabilizer, one or more control surfaces moveably secured to one or more of the first and second wings, the vertical stabilizer(s), and the horizontal stabilizer(s), and a gust compensation system configured to adaptively reduce gust loads exerted into the aircraft. The gust compensation system may include a first sensor secured proximate to the cockpit. The first sensor is configured to output a first signal. A second sensor may be distally located from the cockpit. The second sensor is configured to output a second signal. A gust signal sub-system is configured to receive the first and second signals and generate a gust signal based on analysis of the first and second signals. The gust signal sub-system is configured to output the gust signal to modify a load parameter signal in response to the gust signal exceeding a load alleviation threshold. A load alleviation (LA) sub-system may be operatively coupled to the control surface(s). The LA sub-system is configured to detect the load parameter signal. The LA sub-system is configured to maintain the control surface(s) in a normal configuration when the load parameter signal is unmodified by the gust signal. The LA sub-system is configured to move the control surface(s) into a gust load reduction configuration in response to the load parameter signal being modified by the gust signal.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide systems and methods for quickly and accurately identifying a wind gust or wind gust loads on an aircraft wing. The systems and methods provide a quick response time in the event a wind gust is sufficient to require various wing control surfaces to be deflected. The systems and methods also provide the ability to distinguish between a wind gust and a pilot initiated maneuver. Providing this information quicker than is achievable with the prior systems and methods reduces the gust loads on the wings and therefore reduces the amount of structure that is currently used to ensure compliance with FAA regulations. By reducing overall aircraft structure, the weight of the aircraft is reduced and fuel efficiency is increased.

Various aircraft include inertial sensors, such as accelerometers, which may be mounted on wings, for example. The inertial sensors are used to detect the occurrence of a gust.

The loads on the wings may be reduced by, for example, deflecting portions of the wing surfaces prior to the full load effects of the wind gust on the wings. Accordingly, data may be acquired from one or more angle of attack vanes in front of the aircraft to facilitate detection of the wind gust. When a gust is detected, for example, by information provided from the angle of attack vane(s) and/or inertial sensors, embodiments of the present disclosure may analyze the information, and deflect the wings earlier (as compared to prior methods) to reduce the load that is exerted on the wings. In this manner, it is contemplated that the structural weight of the aircraft may be reduced, thereby reducing fuel consumption, while still satisfying FAA safety requirements regarding wind gusts.

Certain embodiments of the present disclosure provide a method for estimating wind gusts that may include receiving at least one input from at least one angle of attack vane, receiving at least one input from one or more inertial sensors (such as one or more accelerometers) located downstream from the angle of attack vane(s), calculating a magnitude of a wind gust using the received inputs, and deflecting at least a portion of an aircraft wing based on the calculated magnitude. In at least one embodiment, the angle of attack vane may be located proximate to a nose of the aircraft. The inertial sensor(s) may be mounted on a wing of the aircraft, or various other locations.

Certain embodiments of the present disclosure provide a method of distinguishing between a wind gust and a pilot directed maneuver. The method may include receiving pilot directed inputs at a computer, receiving inputs from at least one sensor and at least one angle of attack vane at the computer, determining if a load on an aircraft wing is attributable to a pilot directed command or a wind gust, and deflecting at least a portion of an aircraft wing if the load on the wing is expected due to the wind gust.

Certain embodiments of the present disclosure provide systems and methods that are configured to reduce aircraft structural loads caused by discrete gust encounters. For example, certain embodiments of the present disclosure may provide a gust detection system that is based on angle of attack and other air and inertial data parameters, and a control surface deflection sub-system designed to provide structural load relief.

Certain embodiments of the present disclosure provide a gust compensation system and method that is configured to estimate a gust by comparing a vane angle of attack with an inertial angle of attack (which may be determined as a difference between pitch attitude and flight path angle based on the bulk motion of the aircraft). In various aircraft, total motion is influenced by airflow over the wing and tail planes. The vane has relatively low inertia. Therefore, the vane may react instantly to changes in the local airflow. Further, the vane is typically located at the nose of the aircraft, thereby affording an advance opportunity to sense a gust before it is penetrated by a wing and tail. When vane and inertial angle of attack differ significantly, the difference indicates an aerodynamic disturbance which has yet to influence aircraft motion. In other words, embodiments of the present disclosure may be configured to detect a gust before it is fully encountered.

Embodiments of the present disclosure may utilize various other types of sensors to detect a gust. For example, light detection and ranging (LIDAR) sensors, delta pressure sensors, and the like may be used.

Embodiments of the present disclosure provide systems and methods that may be configured to detect a gust that exceeds a particular threshold. For example, wing surface reconfiguration may be suited for gusts above a particular threshold. Detection thresholds may be tuned to maximize utilization of the fuel-efficient clean wing configuration while retaining the structural load improvement in situations where it yields a benefit for structural weight.

Figure 1:
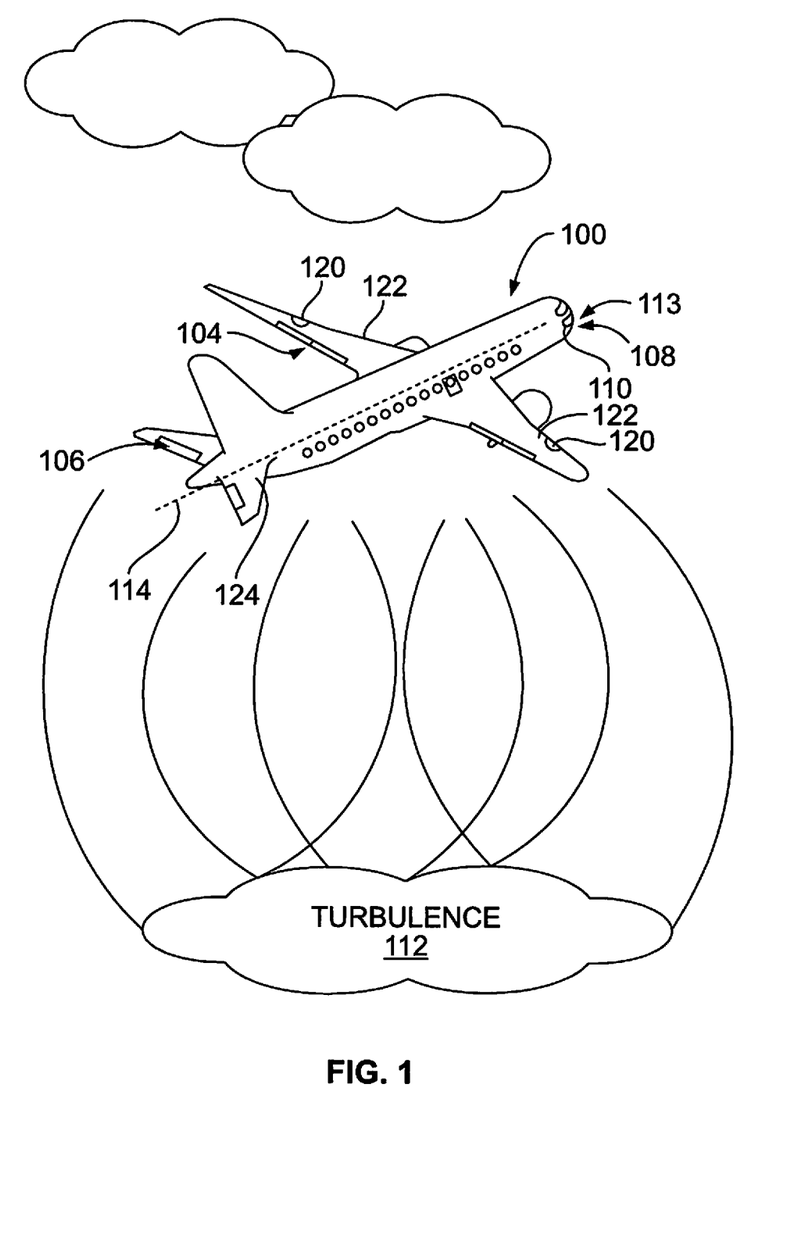
FIG. 1 illustrates a perspective top view of an aircraft, according to an embodiment of the present disclosure.

FIG. 1 illustrates a perspective top view of an aircraft 100, according to an embodiment of the present disclosure. The aircraft 100 may include control surfaces such as, but not limited to, flaperons or ailerons 104, an elevator 106, a canard 108, spoilers, and the like. The lift-generating control surfaces (such as the flaperons or ailerons 104) may be hinged control surfaces attached to a trailing edge of a wing of a fixed-wing aircraft. The flaperons or ailerons 104 may control a roll or bank (degree of rotation about a longitudinal axis) of the aircraft 100. In at least one embodiment, the flaperons 104 on each wing may be lowered together to function much the same way as a dedicated set of flaps. In other embodiments, the ailerons 104 on each wing may be actuated differently, such as with one aileron downward while the other aileron is upward to control roll of the aircraft 100.

The elevator 106 and the canard 108 may be used to control a pitching motion of the aircraft 100, and are known as pitch control surfaces. The elevator 106 may be located at a rear of the aircraft and helps control a vertical movement of the aircraft 100. There may be two elevators 106 where each is attached to each side of a fuselage. Further, the elevator 106 controls a position of a nose of the aircraft 100 and angle of attack of a wing. The canard 108 is mounted at a front of the aircraft 100, which operates in a manner similar to the elevator 106.

As explained below, the aircraft 100 may include a gust compensation system, which may be an active aircraft control system that is configured to reduce the aircraft response to turbulence 112. The term turbulence may be interchangeably used with the phrase gusts of wind. The active aircraft control system is readily available when turbulence 112 is encountered during a flight. For example, weather forecasts may be inaccurate, existing warning from radar may not detect turbulence unless moisture is present, and avoidance may not be timely or possible, causing the aircraft 100 to fly into turbulence 112. Sensing turbulence 112, the gust compensation system may operate cooperatively with many different devices, which may be used to sense and measure turbulence, generate a command to the aircraft flight controls, and/or actuate the direct lift control surfaces and the pitch control surfaces.

The aircraft 100 may include a vane 110, which may be located proximate to a nose 113 of the aircraft 100. The vane 110 may be configured as an angle of attack sensor and used to measure local airstream angle with respect to a longitudinal reference plane 114 of the aircraft 100.

The aircraft 100 may also include one or more inertial sensors 120. For example, the inertial sensors 120 may be or include accelerometers. The inertial sensors 120 may be mounted to wings 122 of the aircraft 100. As such, the inertial sensors 120 may be configured to detect an angle of attack of the wings 122 on which they are mounted.

As shown, the vane 110 may be positioned upstream (that is, at a position that encounters airflow prior to) the inertial sensors 120. The vane 110 may be located at a position of the aircraft 100 that is closer to the nose 113 than the inertial sensors 120. In this manner, the vane 110 may encounter a gust before the inertial sensors 120.

Optionally, the aircraft 100 may include additional vanes or other sensors upstream from the wings. Further, the aircraft 100 may include more or less inertial sensors 120 than shown. Further, the inertial sensors 120 may be positioned at various other areas of the aircraft 100. For example, the inertial sensors 120 may be positioned upstream from the wings but downstream (for example, distally located from the nose 113) from the vane 110. In at least one embodiment one or more inertial sensors 120 may be mounted to a tail 124 of the aircraft 100.

In operation, an air signal, such as a vane angle of attack signal, is output by a first sensor, such as the vane 110, and received by a control unit (not shown in FIG. 1) of the gust compensation system. Similarly, one or more inertial signals, such as inertial angle of attack signals, are output by the one or more second sensors, such as inertial sensors 120, and received by the control unit. The control unit then analyzes the air signal and the inertial signal to determine the existence of a gust, as explained below.

Figure 2:
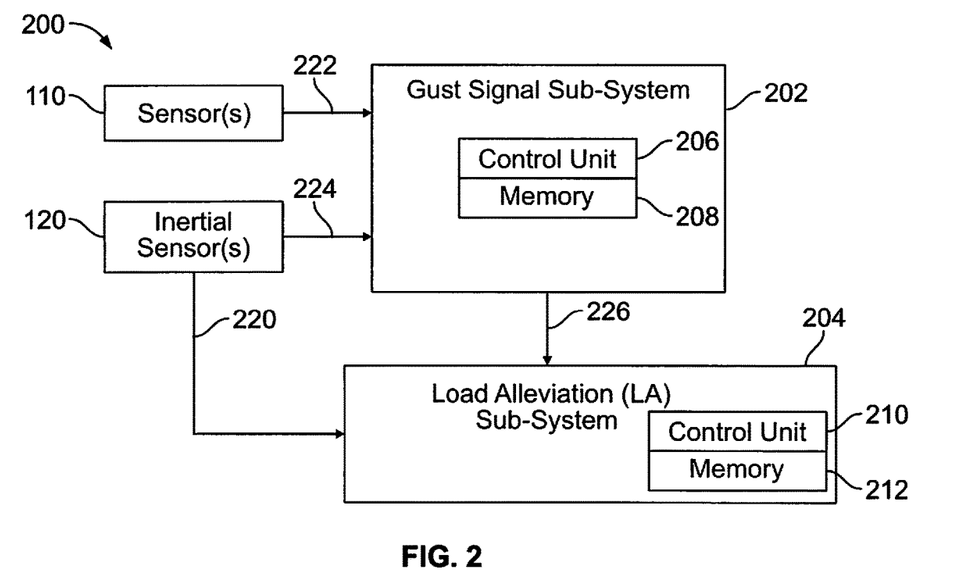
FIG. 2 illustrates a block diagram of a gust compensation system, according to an embodiment of the present disclosure.

FIG. 2 illustrates a block diagram of a gust compensation system 200, according to an embodiment of the present disclosure. The gust compensation system 200 may include a gust signal sub-system 202 in communication with the vane 110 and the inertial sensor(s) 120 through one or more wired or wireless connections. Instead of a vane, the sensor(s) 110 may be various other types. For example, the sensor(s) 110 may be or include one or more of a forward-looking sensor, a pressure port mounted on a wing or body, a reactive sensor (such as an accelerometer), and/or the like. The gust signal sub-system 202 may, in turn, be operatively coupled to (such as through one or more wired or wireless connections) a load alleviation (LA) sub-system 204. The LA sub-system 204 may be used to alleviate loads associated with 1 g flight aircraft maneuvers and gusts. The LA sub-system 204 may include a maneuver load alleviation system having a vertical gust suppression (VGS) system, such as described in U.S. Pat. No. 8,774,987, entitled "Vertical Gust Suppression System for Transport Aircraft," which is hereby incorporated by reference in its entirety.

The gust signal sub-system 202 may include a control unit 206 and a memory 208. In at least one embodiment, the control unit 206 may include the memory 208, or vice versa. Optionally, the control unit 206 may be separate and distinct from the memory 208. Similarly, the LA sub-system 204 may include a control unit 210 and a memory 212. In at least one embodiment, the control unit 210 may include the memory 212, or vice versa. Optionally, the control unit 210 may be separate and distinct from the memory 212. Alternatively, a single control unit and memory may be used with respect to both the gust signal sub-system 202 and the LA sub-system 204. For example, the gust compensation system 200 may include a single control unit and/or memory that is used to control operation of both gust estimation and load alleviation.

In operation, the LA sub-system 204 may receive a load parameter signal 220 from the inertial sensor(s) 120. The load parameter signal 220 may be or include one or more of an inertial angle of attack signal 224, an indication of load (whether estimated, measured, or predicted), an indication of lift (whether estimated, measured, or predicted), an indication of pressure, a sideslip angle signal, a lateral acceleration signal, or the like that is output to the gust signal sub-system 202. The load parameter signal 220 may include a normal acceleration signal that relates to acceleration of an aircraft normal to a length of the plane, such as to the central longitudinal plane 114 of the aircraft 100 (shown in FIG. 1). The normal acceleration may be perpendicular to the length of the aircraft 100 (for example, an upwardly-directed gust of wind that is exerted into lower surfaces of the wings, or a sideways-directed gust of wind that is exerted on the fuselage and vertical stabilizer). Based on the load parameter signal 220, the control unit 210 may determine the existence of gust encountered at areas of the aircraft at which the inertial sensor(s) 120 are located. The control unit 210 may reconfigure control surfaces of the aircraft (such as ailerons, flaperons, elevators, canards, spoilers, and the like) based on analysis of the load parameter signal 220. For example, the load parameter signal 220 may represent gust force exerted normal to wing surfaces at which the inertial sensor(s) 120 is located. By analyzing the load parameter signal 220, the control unit 210 may determine the existence of gust. Instructions for operation of the LA sub-system 204 may be stored in the memory 212.

Notably, the load parameter signal 220 is based on the gust force as it is exerted on the wings, for example. As such, the control surfaces of the wings may be reconfigured by the LA sub-system through analysis of the load parameter signal 220 in response to a gust as it is exerted on the wings. However, a time delay may exist between an initial time of detection of the gust through the load parameter signal 220 and a subsequent time of control surface reconfiguration. The gust signal sub-system 202 is used to estimate, measure, or predict the gust before it is exerted onto or into the wings, in order to reconfigure the control surfaces prior to the gust being exerted into (and/or prior to peak load being exerted into) the wings, for example.

The gust signal sub-system 202 receives an air signal (such as an air vane angle of attack signal 222) from the first sensor, such as the vane 110, and an inertial signal (such as an inertial angle of attack signal 224) from the inertial sensor(s) 120. While the first sensor is shown as a vane 110, it is to be understood that the first sensor may optionally be various other types of sensors. The control unit 206 compares the vane angle of attack signal 222 to the inertial angle of attack signal 224. If the vane angle of attack signal 222 and the inertial angle of attack signal 224 are equal, or within a defined range, the control unit 206 may refrain from outputting a gust signal to the LA sub-system 204. If, however, the vane angle of attack signal 222 differs from the inertial angle of attack signal (for example, differing greater than the defined range), then the gust signal sub-system 202 may output a gust signal 226 to the LA sub-system 204, which may then reconfigure the control surfaces of the aircraft based on the gust signal 226. In at least one embodiment, the gust signal 226 may be used to modify the load parameter signal 220 which is used by the LA sub-system 204 to operate one or more control surfaces of the aircraft from a normal configuration to a gust load reduction configuration.

In at least one embodiment, the gust signal sub-system 202 may analyze received signals from a first sensor, such as the vane 110, and a second sensor, such as at least one of the inertial sensors 120. The gust signal sub-system 202 may determine the gust signal 226 through one or more of pitch attitude or angle, vertical speed, true airspeed, roll attitude or angle, pitch rate, sideslip angle, vane angle of attack, and/or the like. As an example, the control unit 206 of the gust signal sub-system 202 may determine the gust signal 226 as follows:

$$\alpha\_gust = \alpha\_air + (\sin^{-1}((VS - L^* q^* \pi/180)/TAS) + \beta^* \sin\Phi - \theta)/\cos\Phi$$

in which $\alpha\_gust$ is the gust signal 226, $\theta$ is the pitch angle in degrees, $\beta$ is the sideslip angle in degrees, $\Phi$ is the roll angle in degrees, q is the pitch rate in degrees per second, VS is the vertical speed in feet per second, TAS is the true air speed in feet per second, and $\alpha\_air$ is the vane angle of attack. Alternatively, the control unit 206 may determine the gust signal 226 using other formulas and/or methods.

The vane responds to the gust before the inertial sensors because the angle of attack changes instantly, while the inertial sensors wait for lift on the wing to develop. As such, the gust signal 226 may be determined quicker than the load parameter signal 220. Therefore, the gust signal 226 allows the LA sub-system 204 to reconfigure the control surfaces of the aircraft before the wings, for example, or other areas on or in which the inertial sensors 120 are located, encounter the gust. In this manner, the control surfaces may be reconfigured to a gust load reduction configuration before peak gust load is exerted into the wings, for example. Instructions for operation of the gust signal sub-system 202 may be stored in the memory 208.

As noted, the vane 110 provides a first sensor that is configured to output a first signal, while each inertial sensor 120 provides a second sensor that is configured to output a second signal. The first and second signals are analyzed to determine a gust signal. For example, the second signal may be subtracted from the first signal to determine a difference, which may be used as an initial gust signal.

Alternatively, instead of the vane 110, the first sensor may be various other types of sensors that may be used to determine an air signal, such as an angle of attack signal. For example, the first sensor may be an accelerometer, a LIDAR sensor, a delta pressure sensor, and/or the like, which may be upstream from the second sensor, which may be an inertial sensor, such as an additional accelerometer. In at least one other embodiment, the system may include more or less sensors than shown. For example, the system 200 may include a single sensor coupled to the gust estimator sub-system 202 and the LA sub-system 204.

As noted, the gust signal sub-system 202 analyzes angle of attack signals output by the vane 110 and the inertial sensor(s) 120. Optionally, the gust signal sub-system 202 may analyze various parameters of the aircraft other than angle of attack. For example, the sensors may be pressure sensors, and the gust signal sub-system 202 may be configured to analyze air pressure signals. In at least one other embodiment, the sensors may be air speed sensors, and the gust signal sub-system 202 may be configured to analyze air speed signals.

Figure 3:
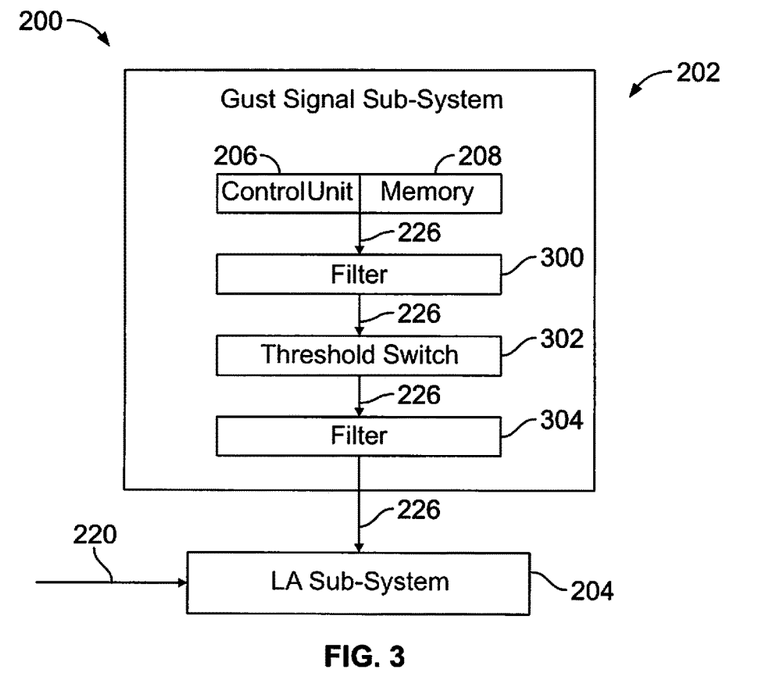
FIG. 3 illustrates a block diagram of a gust compensation system, according to an embodiment of the present disclosure.

FIG. 3 illustrates a block diagram of the gust compensation system 202, according to an embodiment of the present disclosure. The gust signal sub-system 202 may include a filter 300 (such as a wash-out filter), a threshold switch 302, and a filter 304 (such as a lag filter). While shown as being separate and distinct elements, the control unit 206 may alternatively include the filter 300, the threshold switch 302, and the filter 304. Alternatively, the gust signal sub-system 202 may not include one or both of the filters 300 or 304.

In operation, the gust signal sub-system 202 may determine the gust signal 226, as described above. For example, the control unit 206 may analyze the vane angle of attack signal 222 (shown in FIG. 2) and the inertial angle of attack signal 224 (shown in FIG. 2). Each of the vane angle of attack signal 222 and the inertial angle of attack signal 224 may be in relation to the longitudinal reference plane 114 (shown in FIG. 1) of the aircraft 100 (shown in FIG. 1). As such, each of the angle of attack signals 222 and 224 may be angular measurements (such as in degrees) in relation to the longitudinal reference plane 114 of the aircraft 100. Optionally, the angle of attack signals 222 and 224 may be in relation to lateral gusts, for example. In at least one embodiment, the control unit 206 may convert the angular measurements into velocity and/or acceleration measurements. For example, a particular angular measurement may coincide with an air velocity exerted into a portion of the aircraft at which the vane 110 and the inertial sensor(s) 120 are located.

The control unit 206 may determine a difference between the vane angle of attack signal 222 and the inertial angle of attack signal 224 and generate the gust signal 226. The gust signal 226 may be filtered by the wash-out filter 300, which may be configured to remove a steady state component of the gust signal 226, for example. The wash-out filter 300 may be configured to pick up discrete gusts in a defined load frequency range, and ignore continuous gusts that may not be suppressed. Alternatively, the gust signal sub-system 202 may not include the wash-out filter 300.

After being filtered by the wash-out filter 300, the gust signal 226 may be received by the threshold switch 302. The threshold switch 302 is configured to output the gust signal 226 to the LA sub-system 204 when the gust signal 226 meets or exceeds a threshold magnitude, which may be stored in the memory 208. As one non-limiting example, the threshold magnitude may be 10-20 ft/s. Accordingly, if the threshold magnitude exceeds 10-20 ft/s, it may be determined that the loads exerted into the wings are not due to normal aircraft maneuvering. Alternatively, the threshold magnitude may be greater or less than 10-20 ft/s. Further, the threshold magnitude may be measured in different units, such as angular measurements or units of force and/or acceleration. If the gust signal 226 does not exceed the threshold magnitude, the gust signal sub-system 202 refrains from outputting the gust signal 226 to the LA sub-system 204. Alternatively, the gust signal sub-system 202 may continuously output the gust signal 226.

In at least one embodiment, the threshold magnitude may be adapted based on pilot control inputs. For example, as a pilot maneuvers a plane, the threshold magnitude may increase or decrease based on the intended maneuver. If, for example, the pilot intentionally directs the plane to ascend or descend, the threshold magnitude may be greater than if the aircraft were at a cruising altitude.

If the gust signal 226 does exceed the threshold magnitude, the threshold switch 302 switches to an output state. The output state may be or include a force modifier, such as a gust bias. As one non-limiting example, the force modifier may be a multiple of gravitational force, such as 0.10-0.20 g. Optionally, the force modifier may be greater or lesser than 0.10-0.20 g. As such, the gust signal 226 may be modified by the force modifier and received by the lag filter 304. The lag filter 304 may be used to smooth the gust signal 226 before it is output to the LA sub-system 204. Alternatively, the gust signal sub-system 202 may not include the lag filter 304.

As described above, the threshold switch 302 is configured to switch between two states: a first state in which the gust signal 226 is not output to the LA sub-system 204, and a second state in which the gust signal 226 is modified by the force modifier and output to the LA sub-system 204. The gust signal 226 output to the LA sub-system 204 may not be proportional to the force of the gust exerted into the aircraft. For example, when the threshold magnitude is exceeded, the gust signal 226 that is output to the LA sub-system 204 may be the same whether or not the gust signal is 20 ft/s, 30 ft/s, 50 ft/s, or the like. In this manner, the gust signal 226 may not be proportional to the actual gust exerted into the aircraft. Instead, the output gust signal 226 may be used to modify the load parameter signal 220. The load parameter signal 220, in contrast, may be proportional to the gust exerted into the aircraft. The gust signal 226 may modify the load parameter signal 220 and is used to allow the LA sub-system 204 to begin deflecting certain control surfaces of the aircraft before the gust is actually exerted into portions, such as wings, of the aircraft. In short, the gust signal 226 may be used to preemptively deflect control surfaces before the gust acts upon certain load bearing surfaces (such as wings) of the aircraft. Alternatively, the threshold switch 302 may be configured to output proportional gust signals to the LA sub-system 204.

As the LA sub-system 204 receives the gust signal 226, the LA sub-system 204 may begin deflecting the control surfaces to reduce the force of the gust (for example, the gust load). The gust signal 226 may be received by the LA sub-system before the load parameter signal 220 is analyzed by the LA sub-system 204. Therefore, the LA sub-system 204, through the gust signal 226, anticipates the gust and begins deflecting control surface(s) of the aircraft to suppress the gust before portions of the aircraft (such as the wings) encounter the gust.

While not shown, the LA sub-system 204 may also include various filters. For example, a structural notch filter may be used by the LA sub-system 204 to filter the load parameter signal 220. Further, a non-linear filter may be used to filter a combined signal, which may include the load parameter signal as modified by the received gust signal 226. Alternatively, the LA sub-system 204 may include more or less filters than described.

Referring to FIGS. 1-3, a gust may be exerted into the aircraft 100. A first sensor of the aircraft, such as a vane, detects the gust, and outputs a first signal. For example, the first signal may be an angle of attack signal. A change in angle of attack from a stored normal acceleration signal may indicate the gust. The first sensor detects the gust before the second sensor, such as an inertial sensor. The gust signal sub-system 202 then computes a gust signal based on an analysis of the signals received from the sensor sub-system, such as through (but not limited to) a comparison of the first signal received from the first sensor and the second signal received from the second sensor. In at least one embodiment, the gust signal sub-system 202 may convert angular measurements of the first and second signals into velocity and/or acceleration signals. The gust signal sub-system 202 may compare the first and second signals to determine a difference therebetween. If the difference exceeds a threshold magnitude, such as a gust bias activation threshold, the gust signal sub-system 202 outputs the gust signal 226 to the LA sub-system 204. In this manner, the output gust signal 226 may represent a gust bias activation signal that causes the LA sub-system to deflect control surfaces of the aircraft 100 into a gust load reduction configuration before the gust encounters certain surfaces, such as wings, of the aircraft. Accordingly, the LA sub-system 204 may transition to a gust load reduction configuration before a peak load of the gust is exerted into certain surfaces, such as the wings, of the aircraft.

The gust signal sub-system 202 may be used to detect discrete gusts that exceed a predefined threshold. In response to the gust signal sub-system 202 outputting the gust signal 226 that exceeds the threshold, the LA sub-system 204 quickly reconfigures control surfaces (such as ailerons, spoilers, and the like) to a gust load reduction configuration, which is configured to reduce discrete gust loads on the aircraft 100. The gust signal sub-system 202 suppresses gust loads more so than if only the LA sub-system 204 were used. The gust signal sub-system 202 outputs the gust signal 226 (when a difference between sensors exceeds a load alleviation threshold) to add a gust bias to the load parameter signal 220, thereby quickly achieving a gust load reduction configuration. As noted, the first sensor(s) may be located upstream from the second sensor(s) (which may be located on the wings), and are therefore able to detect the gust before it reaches the wings.

As used herein, the term "controller," "control unit," "unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor capable of executing the functions described herein. Such are exemplary only, and are thus not intended to limit in any way the definition and/or meaning of such terms.

Referring to FIGS. 2 and 3, the control unit(s) (such as the control units 206 and 210) may be configured to execute a set of instructions that are stored in one or more storage elements (such as the memories 208 and 212), in order to process data. For example, each control unit may include one or more memories. The storage elements may also store data or other information as desired or needed. The storage elements may be in the form of an information source or a physical memory element within a processing machine.

The set of instructions may include various commands that instruct the control unit(s) as a processing machine to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units. It is to be understood that the processing or control units may represent circuit modules that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control units may represent processing circuitry such as one or more of a field programmable gate array (FPGA), application specific integrated circuit (ASIC), microprocessor(s), a quantum computing device, and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

Figure 4:
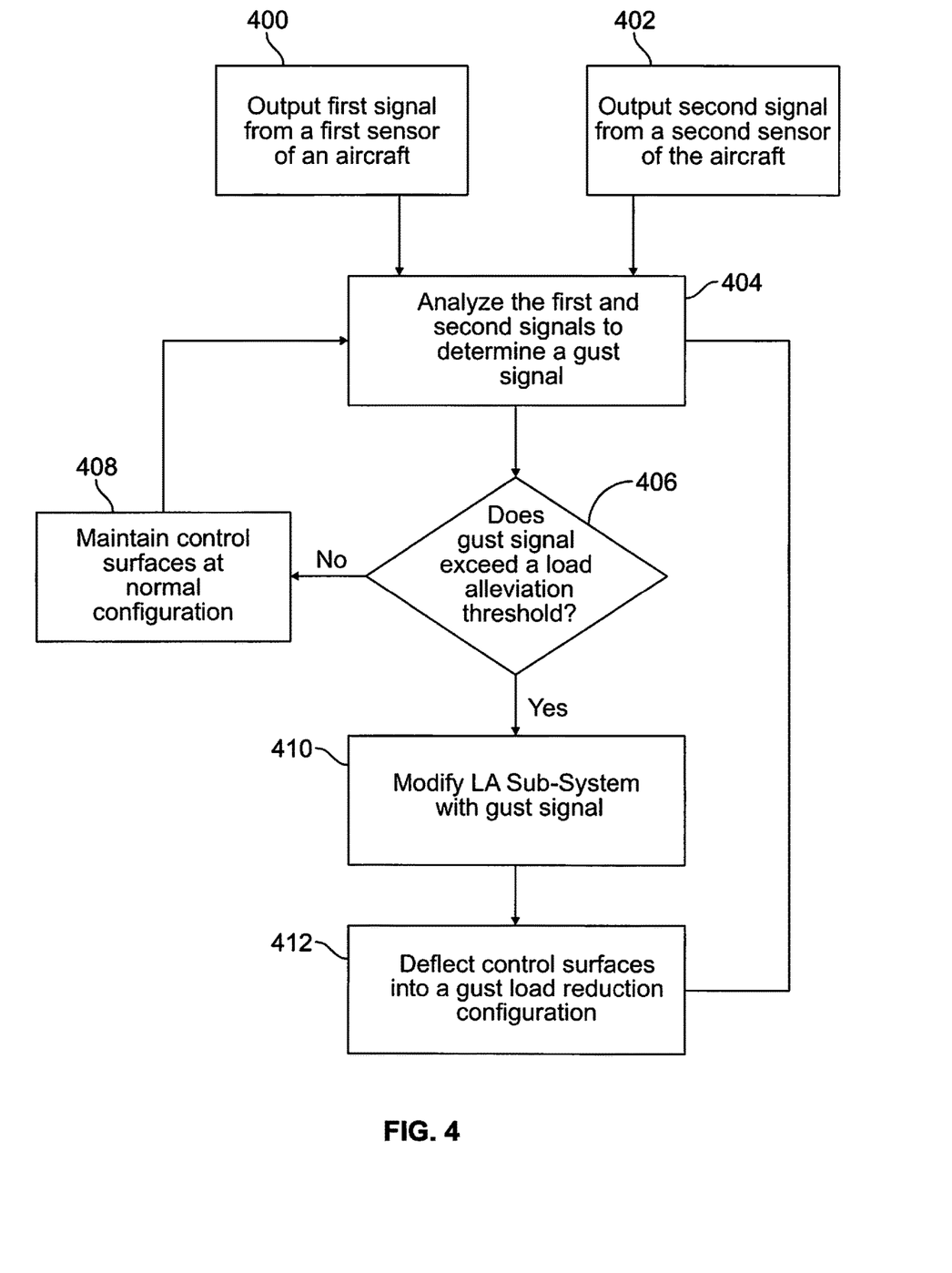
FIG. 4 illustrates a flow chart of a gust compensation method for an aircraft, according to an embodiment of the present disclosure.

FIG. 4 illustrates a flow chart of a gust compensation method for an aircraft, according to an embodiment of the present disclosure. At 400, a first sensor (such as a vane proximate to a nose of an aircraft) is used to output a first signal (such as an angle of attack signal). At 402, a second sensor (such as an inertial sensor located on or within a wing of an aircraft or various other locations) is used to output a second signal (such as an inertial angle of attack signal).

The first and second signals may be received by a gust signal sub-system. At 404, the first and second signals are analyzed to determine a gust signal. In at least one embodiment, the first and second signals may be output as angular measurements, which may be converted into corresponding wind velocities and/or accelerations.

At 406, it is determined whether the gust signal warrants a load alleviation command. For example, it is determined whether the gust signal exceeds a pre-defined load alleviation threshold. The load alleviation threshold may be a threshold quantity, such as a wind velocity or load, which may be greater than a wind velocity or load that is exerted into or onto the wings of an aircraft during intentional flight maneuvers. If the gust signal does not exceed the load alleviation threshold, the method proceeds to 408, in which control surfaces of the aircraft are maintained at a normal configuration. The method then returns to 404.

If, however, the gust signal exceeds the pre-defined load alleviation threshold at 406, the method proceeds to 410, in which a load parameter signal as detected by an LA sub-system, is modified by the gust signal. Then, at 412, the LA sub-system deflects the control surfaces into a gust load reduction configuration based on the modified load parameter signal. The process then returns to 404.

Figure 5:
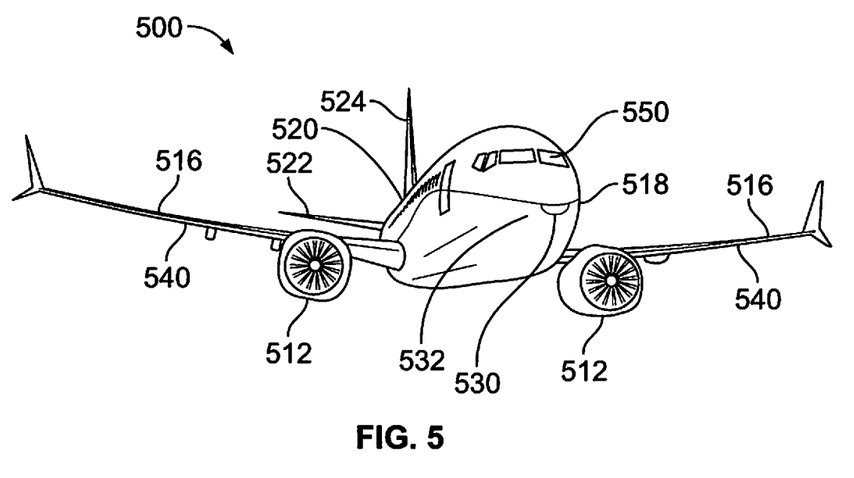
FIG. 5 illustrates a perspective front view of an aircraft, according to an embodiment of the present disclosure.

FIG. 5 illustrates a perspective front view of an aircraft 500, according to an embodiment of the present disclosure. The aircraft 500 may include a propulsion system that may include two turbofan engines 512, for example. Optionally, the propulsion system may include more engines 512 than shown. The engines 512 are carried by wings 516 of the aircraft 500. In other embodiments, the engines 512 may be carried by a fuselage 518 and/or an empennage 520. The empennage 520 may also support horizontal stabilizers 522 and a vertical stabilizer 524.

The wings 516, the horizontal stabilizers 522, and the vertical stabilizer 524 may each include one or more control surfaces. A first sensor 530 (or multiple first sensors), such as a vane, may be positioned at or proximate to a nose 532 of the aircraft 500. A second sensor 540, such as an inertial sensor (for example, an accelerometer) may be coupled to each wing 516 or various other locations. A gust signal sub-system and an LA sub-system may be positioned within the fuselage 518, such as within a cockpit 550 or other portions of an internal cabin. The gust signal sub-system may be in communication with the first sensor 530 and the second sensor(s) 540. The LA sub-system may be in communication with the second sensor(s) 540 and the gust signal sub-system.

Referring to FIGS. 1-5, embodiments of the present disclosure provide systems and methods for quickly and efficiently configuring an aircraft to compensate for gusts. Embodiments of the present disclosure provide systems and methods for withstanding wind gusts that do not increase an overall structural weight of an aircraft.

In at least one embodiment, first and second sensors may detect a gust. Based on an analysis of signals output by the first and second sensors, one or more control units may generate a gust measurement or prediction. The control unit(s) may then calculate a command related to the gust measurement or prediction (such as a command to reconfigure one or more control surfaces). The command may then cause the control surfaces to be reconfigured to reduce gust loads. If the control unit(s) determine that no load alleviation is necessary (such as if a gust signal does not exceed a defined threshold), the control surfaces are not reconfigured, but instead remain in a minimum drag configuration.

Embodiments of the present disclosure provide gust compensation systems and methods that are configured to adaptively reduce gust loads exerted into an aircraft. For example, when a gust is detected, embodiments of the present disclosure may switch control surfaces of the aircraft from a normal configuration to a gust load reduction configuration (in which one or more of the control surfaces are deflected).

Embodiments of the present disclosure may be used to reduce loads on a fuselage, wing(s), empennage, and/or the like of an aircraft. Embodiments of the present disclosure provide systems and methods for reducing loads due to gust and maneuvers either individually or in tandem. Control surfaces may be actuated individually or in conjunction with one another to reduce loads. Further, certain embodiments of the present disclosure may be used to compensate for unintentional and transient disturbances to an aircraft as a result of control surfaces being deflected in a load alleviation configuration.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A gust compensation method configured to adaptively reduce gusts exerted into an aircraft, the gust compensation method comprising:
   detecting at least one first parameter of an aircraft with a first sensor proximate to a front of an aircraft;
   outputting a first signal based on the at least one first parameter from the first sensor;
   detecting the at least one second parameter of the aircraft with a second sensor;
   outputting a second signal based on the at least one second parameter from the second sensor;
   using a gust signal sub-system to generate a gust signal that predicts a gust before it is exerted onto or into wings of the aircraft based on analysis of the first and second signals in order to move control surfaces in response to the gust signal prior to the gust being exerted into the wings; and
   modifying a load parameter signal with the gust signal in response to the gust signal.

2. The gust compensation method of claim 1, wherein the second sensor is distally located from the front of the aircraft, and wherein the gust compensation method further comprises comparing the gust signal to a load alleviation threshold, wherein the modifying operation comprises modifying the load parameter signal with the gust signal in response to the gust signal exceeding the load alleviation threshold.

3. The gust compensation method of claim 1, further comprising causing control surfaces of the aircraft to change from a normal configuration to a gust load reduction configuration in response to the modifying operation.

4. The gust compensation method of claim 1, further comprising:
   processing the load parameter signal with a load alleviation (LA) sub-system;
   maintaining the control surfaces in a normal configuration when the load parameter signal is unmodified by the gust signal; and
   moving the control surfaces into a gust load reduction configuration in response to the modifying operation.

5. The gust compensation method of claim 1, wherein the load alleviation threshold comprises a load magnitude that exceeds a load exerted on a wing of the aircraft caused by intentional maneuvering of the aircraft.

6. The gust compensation method of claim 1, wherein the gust signal is determined as follows:

$$\alpha\_gust = \alpha\_air + (\sin^{-1}((VS - L*q*\pi/180)/TAS) + \beta*\sin\Phi - \theta)/\cos\Phi$$

in which $\beta\_gust$ is the gust signal, $\theta$ is a pitch angle of the aircraft, $\beta$ is a sideslip angle of the aircraft, $\Phi$ is a roll angle of the aircraft, $q$ is a pitch rate of the aircraft, VS is a vertical speed of the aircraft, TAS is a true air speed of the aircraft, and $\beta\_air$ is a vane angle of attack.

7. A gust compensation system configured to adaptively reduce gust loads exerted into an aircraft, the gust compensation system comprising:
   a sensor sub-system coupled to the aircraft, wherein the sensor sub-system is configured to output one or more signals; and
   a gust signal sub-system configured to receive the one or more signals and generate a gust signal that predicts a gust before it is exerted onto or into wings of the aircraft based on analysis of the one or more signals, wherein the gust signal sub-system is configured to output the gust signal to move control surfaces in response to the gust signal prior to the gust being exerted into the wings.

8. The gust compensation system of claim 7, wherein the sensor-sub-system comprises:
   a first sensor proximate to a front of the aircraft, wherein the first sensor is configured to output a first signal; and
   a second sensor distally located from the front of the aircraft and configured to output a second signal, wherein the gust signal sub-system is configured to receive the first and second signals and generate the gust signal based on analysis of the first and second signals, and wherein the gust signal sub-system is configured to output the gust signal to move control surfaces in response to the gust signal.

9. The gust compensation system of claim 7, wherein the gust signal sub-system is configured to output the gust signal to modify a load parameter signal in response to the gust signal exceeding a load alleviation threshold.

10. The gust compensation system of claim 9, wherein the load parameter signal as modified by the gust signal causes control surfaces of the aircraft to change from a normal configuration to a gust load reduction configuration.

11. The gust compensation system of claim 7, further comprising a load alleviation (LA) sub-system operatively coupled to one or more control surfaces of the aircraft, wherein the LA sub-system is configured to detect the load parameter signal, wherein the LA sub-system is configured to maintain the one or more control surfaces in a normal configuration when the load parameter signal is unmodified by the gust signal, and wherein the LA sub-system is configured to move the one or more control surfaces into a gust load reduction configuration in response to the load parameter signal being modified by the gust signal.

12. The gust compensation system of claim 8, wherein the first sensor comprises a vane that is configured to output the first signal as a vane angle of attack signal, and wherein the second sensor is an inertial sensor that is configured to output the second signal as an inertial angle of attack signal.

13. The gust compensation system of claim 12, wherein the vane is proximate to a nose of the aircraft, and wherein the inertial sensor is positioned on or in a wing or fuselage of the aircraft.

14. The gust compensation system of claim 8, wherein one or both of the first and second sensors is configured to one or more of directly measure gust, measure a gust induced angle of attack, or detect pressure or force.

15. The gust compensation system of claim 7, wherein the load alleviation threshold comprises a load magnitude that exceeds a load exerted on a wing of the aircraft caused by intentional maneuvering of the aircraft.

16. The gust compensation system of claim 7, wherein the gust signal sub-system comprises at least one control unit operatively coupled to at least one memory.

17. The gust compensation system of claim 7, wherein the gust signal sub-system is configured to generate the gust signal as follows:

$$\alpha\_gust = \alpha\_air + (\sin^{-1}((VS - L*q*\pi/180)/TAS) + \beta*\sin\Phi - \theta)/\cos\Phi$$

in which $\beta\_gust$ is the gust signal, $\theta$ is a pitch angle of the aircraft, $\beta$ is a sideslip angle of the aircraft, $\Phi$ is a roll angle of the aircraft, q is a pitch rate of the aircraft, VS is a vertical speed of the aircraft, TAS is a true air speed of the aircraft, and $\alpha\_air$ is a vane angle of attack.

18. An aircraft comprising:
a fuselage including an internal cabin having a cockpit proximate to a nose of the aircraft;
first and second wings extending from the fuselage;
at least one vertical stabilizer;
at least one horizontal stabilizer;
one or more control surfaces moveably secured to one or more of the first and second wings, the at least one vertical stabilizer, and the at least one horizontal stabilizer; and
a gust compensation system configured to adaptively reduce gust loads exerted into the aircraft, the gust compensation system comprising:
a first sensor secured proximate to the nose, wherein the first sensor is configured to output a first signal;
a second sensor distally located from the nose, wherein the second sensor is configured to output a second signal;
a gust signal sub-system configured to receive the first and second signals and generate a gust signal that predicts a gust before it is exerted onto or into wings of the aircraft based on analysis of the first and second signals, wherein the gust signal sub-system is configured to output the gust signal to modify a load parameter signal in response to the gust signal exceeding a load alleviation threshold; and
a load alleviation (LA) sub-system operatively coupled to the one or more control surfaces, wherein the LA sub-system is configured to detect the load parameter signal, wherein the LA sub-system is configured to maintain the one or more control surfaces in a normal configuration when the load parameter signal is unmodified by the gust signal, and wherein the LA sub-system is configured to move the one or more control surfaces into a gust load reduction configuration in response to the load parameter signal being modified by the gust signal prior to the gust being exerted into the wings.

19. The aircraft of claim 18, wherein the first sensor is a vane that is configured to output the first signal as a vane angle of attack signal, and wherein the second sensor is an inertial sensor secured to a fuselage or one of the first and second wings, and wherein the inertial sensor is configured to output the second signal as an inertial angle of attack signal.

20. The aircraft of claim 18, wherein the gust signal sub-system is configured to generate the gust signal as follows:

$$\alpha\_gust = \alpha\_air + (\sin^{-1}((VS - L*q*\pi/180)/TAS) + \beta*\sin\Phi - \theta)/\cos\Phi$$

in which $\alpha\_gust$ is the gust signal, $\theta$ is a pitch angle of the aircraft, $\beta$ is a sideslip angle of the aircraft, $\Phi$ is a roll angle of the aircraft, q is a pitch rate of the aircraft, VS is a vertical speed of the aircraft, TAS is a true air speed of the aircraft, and $\alpha\_air$ is a vane angle of attack.

\* \* \* \* \*